United States Patent [19]

Lee et al.

[11] 4,367,167

[45] Jan. 4, 1983

[54] PROCESS FOR PREPARING SUPPORTED METAL CATALYSTS

[75] Inventors: George A. Lee, Wayland, Mass.; Stuart N. Isaacs, East Meadow, N.Y.

[73] Assignee: The Dow Chemical Company, Midland, Mich.

[21] Appl. No.: 284,312

[22] Filed: Jul. 17, 1981

[51] Int. Cl.³ .................. B01J 23/42; B01J 23/44; B01J 23/50; B01J 23/52
[52] U.S. Cl. .................................... 252/472; 252/476
[58] Field of Search ............... 252/463, 472, 476, 461

[56] References Cited

U.S. PATENT DOCUMENTS 3,575,888 4/1971 Long ................................ 252/476
3,702,259 11/1972 Nielsen ......................... 252/463 X
4,248,741 2/1981 Wernli et al. ..................... 252/463

Primary Examiner—W. J. Shine
Attorney, Agent, or Firm—A. C. Acona

[57] ABSTRACT

A process for making a supported catalyst comprises contacting a suitable support with an aqueous solution of a metal compound and subsequently contacting said support with a reducing compound dissolved in a water immiscible organic solvent and finally heating said support to reduce the metal compound.

12 Claims, No Drawings

PROCESS FOR PREPARING SUPPORTED METAL CATALYSTS

BACKGROUND OF THE INVENTION

Supported metal catalysts are used in a variety of processes in the chemical industry. Hydrogenation and dehydrogenation processes, cracking processes and oxidation processes are among such processes. The noble metals, especially silver, and the platinum group metals probably are employed most frequently in the above mentioned processes. Platinum has long been used in cracking, hydrogenation and dehydrogenation processes and silver is well known as a catalyst in the production of ethylene oxide by the direct oxidation of ethylene.

Various methods of depositing these metals on supports are known. Generally, the support is impregnated or coated with a solution of the salt of the metal or metals to be employed. This is followed by drying and a subsequent reduction. Although the reducing step can be a thermal reduction in the presence of air or an inert gas (U.S. Pat. No. 2,709,123), hydrogen and hydrazine (U.S. Pat. No. 3,575,888) have also been employed for the reduction. Reducing agents in the form of organic compounds have been added to the catalyst, either by simultaneous application to the support or subsequent addition to the impregnated metal salts. Also reducing compounds have been known to be employed by incorporating them into the support prior to the addition of the catalytic component.

Reducing agents frequently employed with silver salts include carboxylic acids or their salts and nitrogen-containing organic compounds, or ammonia, or a combination of the two as in U.S. Pat. No. 3,702,259. Other nitrogen-containing compounds, e.g. polyacrylonitrile (U.S. Pat. No. 3,892,679), an alkanolamine or an acid amide (U.S. Pat. No. 4,248,740) have also been employed. While the solvent used to apply the reducing agent is frequently water as in U.S. Pat. No. 3,702,259 above, organic solvents also have been employed, as for example, ethylene carbonate, dimethyl formamide and dimethyl sulfoxide as solvents for the polyacrylonitrile in U.S. Pat. No. 3,892,679, above. In the same patent the use of non-solvents to precipitate the polymer from solution onto the support is indicated and is illustrated by the use of methanol and toluene.

SUMMARY OF THE INVENTION

The present invention is an improved process for making supported metal catalysts wherein an aqueous metal salt solution is employed to impregnate a support, followed by addition of the still wet metal salt-impregnated support to a water immiscible organic solvent containing in solution an organic aliphatic amine. Reduction of the salt is accomplished subsequently by heating.

DETAILED DESCRIPTION OF THE INVENTION

The porous catalyst support, e.g. alumina, is immersed in an aqueous solution of a soluble metal salt to impregnate it. While immersed a vacuum is applied to remove air from the pores of the support to insure complete wetting of the support and complete covering thereof by the solution of the metal compound. After draining the thus-impregnated support from excess solution, it is immersed while still wet in an inert water immiscible organic solvent containing a dissolved aliphatic amine.

The use of the water immiscible solvent, contrary to the water-miscible solvents and water itself employed by the art, apparently produces a much more finely divided, smaller deposit of catalyst particles. The reduction is effected by agitating the mixture with heating for a time sufficient to deposit the desired amount of metal onto the support. The reduced catalyst is then recovered by filtration, washed with water and alcohol, dried at reduced pressure below 100° C. Surprisingly the amount of amine required and the time for reduction is less than that taught in the art.

In the case of silver, the particles are about an order of magnitude smaller than those of known amine-reduced silver catalysts. The uniformity of the dispersion and narrow range of particle sizes produced is also remarkable. The amount of silver required for the same catalytic activity is 2–5 times less than generally employed and is apparently a result of the improved dispersion, particle size and distribution. Silver particle size typically ranges from 400–800 Å as compared to 1000–1500 Å taught in the art. The loading of silver can be as low as 2–5% on the support. This compares to 8–20% in known art commercially produced silver catalysts.

While the invention has been described in terms of producing a silver catalyst, other metal catalysts may be made by the same process. Among those known to be adaptable to this process are gold, palladium and platinum.

Support materials suitable for use in making the catalyst are those commonly used having relatively low surface areas of less than 2 m$^2$/g. These include alumina, titania, clays, silica, zeolites and the like.

Metal ions which are known to be useful in forming the reduced metal by the process of this invention are silver (Ag$^+$), gold (Au$^{+++}$), palladium (Pd$^{++}$) and platinum (Pt$^{++++}$). Other which, having similar reduction potentials, should be useful are mercury (Hg$^{++}$) and copper (Cu$^+$).

Concentration of aqueous metal salt solution: Theoretically, any obtainable concentration of metal salt in water may be used to saturate the solid support. With Ag$^+$, we have observed that a lower concentration limit of 0.1 N AgNO$_3$ may be required to prevent discontinuity of deposited metal throughout the porous substrate. Using 0.1 N AgNO$_3$ solution to saturate α-alumina spheres, we observed that during the reduction phase, metal was primarily deposited near the surface of the sphere, and was poorly deposited at the center of the sphere. At higher metal salt concentrations (2 N or greater AgNO$_3$), we have observed a higher density of reduced metal particles which have little particle separation and which appear to be much more susceptible to sintering and agglomeration. It has been determined that a concentration of 0.1 N to 2 N is operable and a preferred concentration of metal salt solution is from about 0.2 N to 1 N, while the concentration which provides highest particle distribution and smallest metal particle size is ca 0.5 N for AgNO$_3$.

Any primary, secondary or tertiary amine or an alkanolamine having from 2 to 24 carbon atoms may be employed. A preferred reducing agent is the combination of an alkanolamine and a primary, secondary or tertiary amine. Aromatic amines are not effective and cannot be used. Useful amines which have proven to be effective reductant species include ethanolamine, methyldiethanolamine, dimethylethanolamine, triethanolamine and triethylamine.

Other amines, which may be employed separately or together with an alkanolamine, are primary amines such as ethyl-, propyl- and hexylamines and the dialkylamines such as diethyl-, dipropyl-, dihexylamine and trialkylamines of up to 8 carbons per alkyl group.

Any water immiscible solvent capable of dissolving the suitable amines is useful in the invention. Solvents are chosen from aromatic or aliphatic hydrocarbons of up to 20 carbon atoms, alkyl esters of organic aliphatic acids, alkyl and aryl ethers and alkyl and aryl nitriles. Aromatic hydrocarbons are, for example, benzene, toluene and xylene. Organic esters which can be used are ethyl acetate, ethylbutyrate, butyl acetate, and the like having from one to eight carbon atoms in the acid moiety and in the alkyl group derived from the alcohol. Aliphatic ethers such as ethyl, propyl, butyl, hexyl and the like, having up to 8 carbon atoms in each alkyl group, and phenyl, benzyl, toluyl, and the like aromatic ethers are also useful. Alkyl and aryl nitriles having up to 8 carbon atoms are also useful so long as they are water immiscible. Those known to be useful are ethyl acetate, hexanes, diethyl ether and toluene. Solvents for the amine should have viscosities of about <200 cps.

The primary function of the inert organic solvent appears to be to provide a medium through which amine reductant can be uniformly applied to the aqueous metal solution saturating the solid support. Therefore, for optimum reduced metal uniformity and dispersion, the solvent should have sufficient volume to cover the solid support. No problems appear to occur when a larger volume (2-3x) of solvent is employed. However, when solvent volumes incapable of completely covering and penetrating the solid support are used, non-uniform reduction of the metal ions is apparent.

Amount of amine reductant: The molar equivalent of amine reductant used per mole of metal ion is dependent upon the structure of the amine (i.e., primary, secondary, tertiary; as well as substituents) and the valency of the metal salt. We have found that 0.1 equivalent of methyldiethanolamine (based on equivalents $AgNO_3$) provides a catalyst containing ca. $\frac{2}{3}$ of the theoretical amount of reduced silver. However, this catalyst required extended reduction times (approximately 4x longer) to achieve this degree of reaction. We have noted that the preferred ratio is 1 equivalent of amine per equivalent of metal. Higher ratios of amine equivalent/metal ion equivalent may be used with certain amines, reduction times may be increased and metal particle size and distribution may be adversely effected.

Reduction: The temperature of reduction is limited by the boiling point of the solvent used to dissolve the amine reductant. Thus, when toluene is employed a temperature of 90° C. or above can be used which requires a shorter period of time. On the other hand, a longer period of time is required when ethyl acetate is the solvent and a temperature below about 75° C. must be employed. While diethyl ether is an acceptable solvent, the reduction requires an unduly long time unless pressure could be applied since the ether boils at ca 35° C. With the amines, metal ions, and solvents examined, the reduction process will proceed at room temperature using extended reaction times. The reduction process is facilitated by the use of heat, and can be conveniently run near the boiling point of the most volatile component in the reaction mixture. For instance, silver nitrate is completely reduced in ca 2.5 hr. using ethyl acetate as solvent and methyldiethanolamine as reducing agent at a reaction temperature of 60° C. When the same reaction is conducted at room temperature, i.e. about 250° C., a period of greater than 10 hr. is required to obtain complete reduction.

For the lower boiling solvents, the time of reduction may be shortened by applying pressure to the system so as to permit the temperature to be increased to 80°-90° C.

When temperatures higher than about 95° C. are employed in our apparatus, water vapor is removed from the reaction media and the reduced metal particles appear to be less uniform. Temperatures even higher than 95° C., however, can be employed without deleterious effect providing the reduction is conducted under pressure.

Reduction time: The amount of time required for reduction of metal ions is determined by the oxidizing strength of the individual metal ion, the structure and reducing power of the amine, the temperature of the reduction process, and the nature of the inert organic solvent. If less time is allowed than necessary for complete reduction, catalysts with lower than theoretical metal loadings will be obtained. If the reaction is carried out beyond the initial complete reduction point, the excess amines and reduction by-products appear to promote metal agglomeration and particle size growth.

Important details of the process of the invention with respect to silver are as follows. In the first step of the deposition process, the alumina support is soaked and saturated with the silver nitrate solution using repeated vacuum application. Upon addition of these saturated beads to the amine/solvent solution, a brown precipitate is noted to form immediately at the surface of the alumina spheres. With time and heat, this surface changes from a brown color to a final grey-black product. The reduction also is observed to begin on the exterior surface of the alumina spheres and proceed radially into the center of the sphere. The progress of the silver reduction process is monitored by periodically removing several beads from the reaction mixture and placing them in a small volume of deionized water. After the beads have been soaked and agitated in this solution, a few drops of this wash solution are added to an equivalent volume of saturated aqueous sodium chloride solution. Any white precipitate which is formed is indicative of unreacted silver ion. After the catalyst has been reduced, washed and dried, the silver metal content on the support is determined by quantitative emission spectroscopy.

In a representative procedure, a known weight of support was immersed in an aqueous solution of a metal salt. A vacuum was applied repeatedly to completely impregnate the support with solution. The amount of solution impregnated in the support was determined by accurately weighing the support before and after the impregnation. Based on the amount of solution taken up, one equivalent (with slight excess) of an amine was added to a volume of an inert, water immiscible, organic solvent. The soaked beads were then dropped into the organic solvent/amine solution and mixed thoroughly. The reduction took place over the course of 1-2 hours (generally) at temperatures of 60° C. or above. The supports were then washed with alcohol, e.g. methanol, and then soaked in both a room temperature and a hot water wash, finally being washed with MeOH. The washed catalyst was then vacuum dried at temperatures between 30° and 60° C.

The following examples are specific for the preparation of a silver catalyst.

EXAMPLE 1

An aluminum-oxide support (Norton α-alumina 3/16" spheres, 10 g) was impregnated with silver ions by soaking the beads under vacuum in aqueous silver nitrate solution (0.5 N). The excess solution was decanted off and the beads were determined to contain a known amount of $AgNO_3$ (6 ml; 0.00302 moles). Ethyl acetate (25 ml) and one equivalent (based on the amount of $AgNO_3$) of methyldiethanolamine (0.38 ml; 0.00332 moles) were mixed in a round-bottom flask. The $AgNO_3$ soaked beads were dropped into the reaction flask and heated with agitation at 60° for 2 hours. The final grey-black beads were decanted from the reaction media, washed with water (100 ml), then soaked in 100 ml of steam heated water followed by washing with an excess of methanol. The beads were vacuum dried in an oven at 60° for about 8 hours.

EXAMPLE 2

Three liters of 3/16" Norton high purity α-alumina spheres (2683 g) was impregnated with 1 N $AgNO_3$ by covering the spheres with 2-liter of 1 N $AgNO_3$ in a 4-liter glass suction flask and repeatedly applying and then breaking vacuum until no drop in the liquid level in the flask was noted. The excess aqueous silver nitrate was then removed by filtration and the "wet" beads were transferred to a 10-liter glass roundbottom flask which contained 2500 ml ethyl acetate. The flask and its contents were attached to a large Büchi rotating evaporator, and while slowly being rotated, MDEA (methyldiethanolamine, 64.4 g, 0.541 mole) in 250 ml ethyl acetate was added. After 30 min. of agitation at room temperature, TEA (triethylamine, 54.7 g, 0.542 mole) in 100 ml ethyl acetate was added and the flask lowered into a hot water bath (73° C.). At the end of 3 hours agitation at 73°, the reaction flask was removed from the hot water bath and allowed to cool to room temperature. The ethyl acetate was filtered off and the catalyst beads washed with 3×1000 ml methanol. The beads were next washed successively with 3×1200 ml portions of warm deionized water, then soaked overnight in deionized water. A final water wash was followed by two successive methanol washes. The washed catalyst was air dried for 1 hour followed by vacuum drying at 45° C. for two days until no more methanol or water was collected in the dry ice/acetone vacuum line traps.

The silver burden on the support was determined to be 3.47% by weight. The particle size was generally <1000 Å.

EXAMPLE 3

A batch of 3/16" Norton α-alumina spheres (3000 ml, 2169.8 g) was vacuum impregnated with 1 N $AgNO_3$. After filtering off the excess silver nitrate solution, the support was reweighed and found to have absorbed 0.999 mole $AgNO_3$. The wet beads were transferred to a 10-liter glass round-bottom flask which contained 2500 ml ethyl acetate. The flask and its contents were attached to a large Büchi rotating evaporator, and while slowly being rotated, MDEA (59.67 g, 0.501 mole) in 250 ml ethyl acetate was added. After 35 min. rotation at room temperature, a second quantity of MDEA (59.8 g, 0.503 mole) in 250 ml ethyl acetate was added, and the reaction flask lowered into a hot water bath thermostated to 70° C. At the end of 6.3 hr. agitation at 70°, the flask was removed from the hot water bath and allowed to cool to room temperature. The ethyl acetate was removed by filtration and the catalyst beads washed with 3×1000 ml methanol. During this methanol wash, extensive loss of black fines was noted. The beads were then placed in a 4-liter beaker and washed repeatedly with deionized water until no color was detected in the waste water. The catalyst was then washed with two 2500 ml portions of hot (80° C.) deionized water, and soaked overnight under methanol. Finally all liquid was removed from the catalyst by filtration and vacuum drying at 60° C. for ~24 hrs. Weight of silver on the support was determined to be 4.3%.

The following example shows the use of a silver catalyst prepared by the method of the present invention for preparing ethylene oxide by direct oxidation of ethylene with molecular oxygen.

EXAMPLE 4

A catalyst containing 4.95% silver, prepared according to Example 3, was placed in a reactor tube through which was passed a mixture of ethylene (6%), oxygen (6%), $CO_2$ (7.5%) and nitrogen (balance) at an average temperature of 234° C., the maximum being 238° C. Over a period of about 60 days the conversion averaged 25.83% and selectivity averaged 73.4%. For comparison a catalyst made according to the process disclosed in U.S. Patent 4,248,741 on a similar alumina support and containing 17.8% silver was run concurrently with the same feed composition in the same kind of reactor at the same conversion (25.83), but the average temperature required to attain this conversion was 250° C., the maximum being 254° C. The selectivity averaged 74.5%. Thus, the catalyst of the invention ran about 16° C. cooler to get approximately the same (~1% difference) yield, or selectivity, and obtained this using less than one-third the amount of silver.

In the following example is shown the preparation of a palladium catalyst using the process of this invention.

EXAMPLE 5

A solution of palladium chloride (1.78 g, 0.01 mol) and potassium chloride (0.75 g, 0.01 mol) in 10 ml water was used to saturate 5 g of Norton α-alumina spheres with repeated vacuum/release treatment. After the excess aqueous solution was removed by filtration, the wet beads were added to ethyl acetate (10 ml) containing triethanolamine (0.4 g, 0.003 mol, 1 equivalent based on amount of $PdCl_2$ adsorbed by the α-alumina). The mixture was agitated at 70° C. for ca 4 hours before recovering the catalyst, washing and drying. Examination of the final catalyst by scanning electron microscopy revealed a very uniform distribution of Pd metal particles having an average size of 500–1000 Å.

Catalysts of gold and platinum have also been made by the above process and these metals have been deposited with the same small average particle size and have the good uniform distribution as shown in the examples.

We claim:

1. A process for producing a supported metal catalyst which comprises (a) impregnating by contacting a suitable porous inert support material with an aqueous solution of a soluble metal salt, (b) removing excess solution, (c) contacting said impregnated support material with an aliphatic amine as a reducing agent dissolved in a water immiscible organic solvent, (d) heating said impregnated support material for a sufficient time to reduce substantially all said metal salt to the metal, and (e) washing and drying the catalyst prior to use.

2. The process of claim 1 wherein the metal salt is a salt of silver, gold, palladium or platinum.

3. The process of claim 2 wherein the aliphatic amine is an alkanolamine.

4. The process of claim 2 wherein the aliphatic amine is a primary, secondary or tertiary amine.

5. The process of claim 4 wherein the reducing agent additionally includes an alkanolamine.

6. The process of claims 2, 3, 4 or 5 wherein the water immiscible organic solvent is selected from aromatic or aliphatic hydrocarbons, organic esters, alkyl ethers, aryl ethers, alkyl nitriles and aryl nitriles.

7. The process of claim 5 wherein the immiscible organic solvent is an aromatic hydrocarbon selected from the group consisting of benzene, toluene or xylene.

8. The process of claim 5 wherein the immiscible organic solvent is an organic ester in which the alkyl group contains from 1 to 8 carbon atoms and the carboxyl radical is a mono carboxylic acid radical containing from 1 to 8 carbon atoms.

9. The process of claim 8 wherein the alkyl carboxylate is ethyl acetate.

10. The process of claim 7, 8 or 9 wherein the reduction is carried out at a temperature of from about 80° to about 95° C.

11. The process of claim 7, 8 or 9 wherein the reduction is carried out at a temperature of from about 25° to about 80° C.

12. The process of claim 2 wherein the reduction is carried out under pressure.

* * * * *